UNITED STATES PATENT OFFICE.

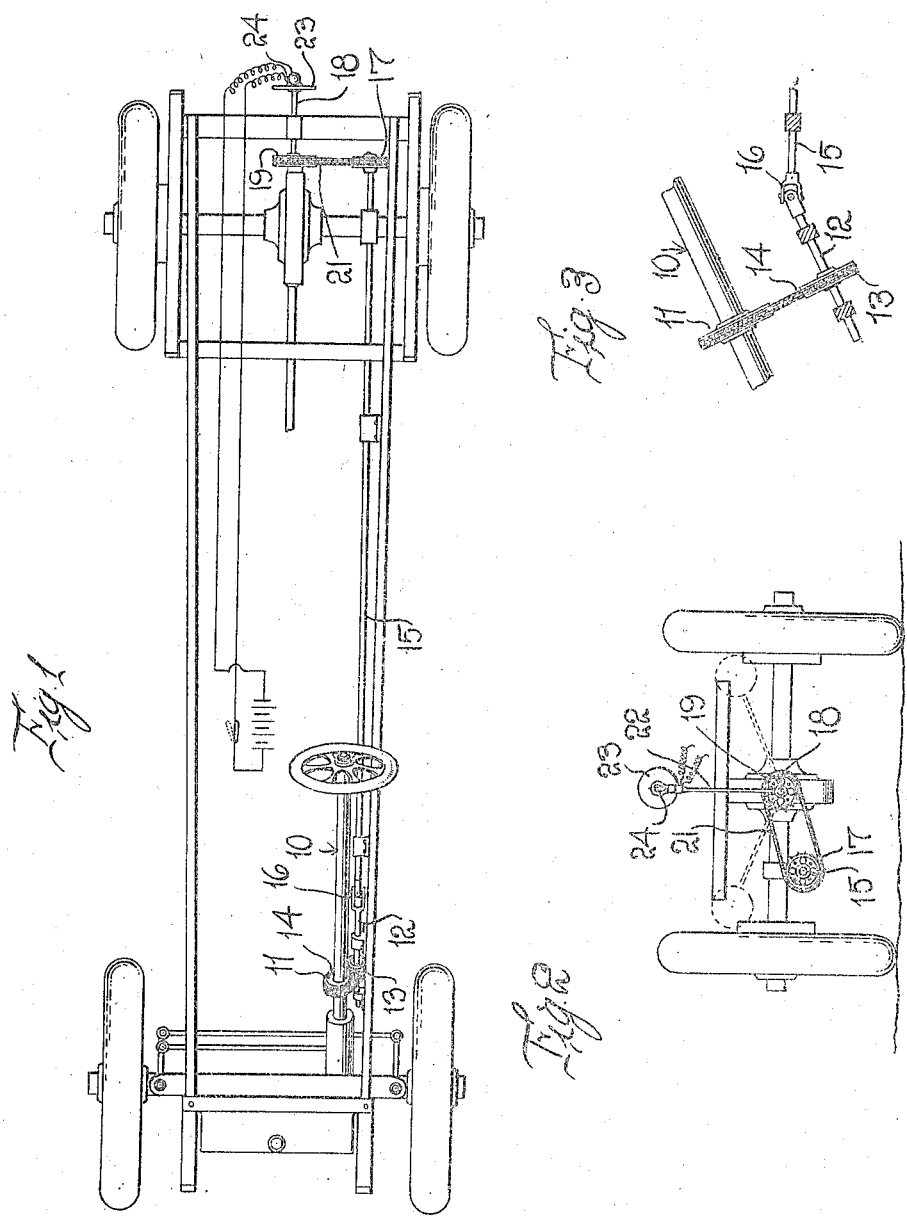

DIRK W. NEARHOF, OF OOSTBURG, WISCONSIN.

DIRECTION-INDICATOR FOR AUTOMOBILES.

1,271,064.

Specification of Letters Patent.

Patented July 2, 1918.

Application filed January 4, 1917. Serial No. 140,591.

*To all whom it may concern:*

Be it known that I, DIRK W. NEARHOF, a citizen of the United States, residing at Oostburg, in the county of Sheboygan and State of Wisconsin, have invented certain new and useful Improvements in Direction-Indicators for Automobiles, of which the following is a specification, reference being had to the accompanying drawings.

This invention relates to automobiles and particularly to devices for indicating the direction about to be taken by an automobile.

The general object of my invention is to provide a very simple mechanism which may be readily applied to all types of automobiles and which will indicate to a following car the direction about to be taken by the car upon which the indicator is mounted.

A further object of the invention is the provision of an indicator which, while of a very simple character, will clearly and plainly indicate both during the day and the night, just how the car is about to move, this device being connected to the steering mechanism of the automobile so that the operator will not have to operate the device separately from the steering wheel but the signal will automatically shift as the steering wheels are shifted.

Other objects will appear in the course of the following description.

My invention is illustrated in the accompanying drawings, wherein—

Figure 1 is a top plan view of the chassis of an automobile with my indicating device applied thereto;

Fig. 2 is a rear elevation of the automobile with the indicating device thereon; and Fig. 3 is a side elevation of a portion of the steering shaft 10 and the shaft sections 12 and 15.

Referring to these figures, it will be seen that I have illustrated in Fig. 1 the chassis of an automobile of the usual type. In this figure 10 designates the steering shaft or post of the automobile having the usual steering wheel and being connected in any suitable manner to the steering knuckle of the forward wheels. Mounted upon this steering shaft 10 is a sprocket wheel 11 and mounted in any suitable manner upon the frame of the automobile is a shaft 12 which extends upward and rearward and carries upon it a sprocket wheel 13 which is connected to the sprocket wheel 11 by means of a sprocket chain 14. Operatively mounted upon the frame of the car in any suitable manner is a rearwardly extending shaft 15 which is connected by a universal joint 16 with the shaft section 12. A flexible shaft is thus provided by the two sections 12 and 15. At its rear end the shaft 15 carries upon it a sprocket wheel 17 and operatively mounted upon the rear of the supporting frame of the automobile is a shaft 18 carrying a sprocket wheel 19. A sprocket chain 21 connects the sprocket wheels 17 and 19 for unitary rotation. The shaft 18 at its rear end is provided with an angularly directed arm 22 which carries upon its rear end a disk 23 or other object which may be illuminated and which will be plainly obvious to the driver of a car behind and mounted in connection with this disk is an electric light 24 whereby the disk may be illuminated at night. The disk is preferably painted white or some other color which will render it distinctly observable. Under ordinary circumstances, when the car is moving ahead, the arm will be in a vertical position but if the operator shifts the steering wheel to turn the car to the right, the shaft 18 will rotate to carry the arm 22 to the right and if the operator shifts the steering wheel so as to turn the machine to the left, the shaft 18 will be rotated to carry the arm 22 to the left. It will be seen that the degree of turning movement is clearly illustrated by the position of the arm 22.

I have not illustrated the electric connections to the electric light as these will be obvious to any one skilled in the art. I do not wish to be limited to the exact construction of my indicator as it is obvious that many minor changes may be made therein without departing from the spirit of the invention as set forth in the appended claim.

Having described my invention, what I claim is:

The combination with an automobile including a steering shaft, of a sprocket wheel mounted upon the steering shaft, a shaft section mounted upon the frame of the automobile and extending upward and rearward and having a sprocket gear wheel operatively connected to the first named sprocket gear wheel, a second named shaft mounted upon the frame of the automobile and extending rearward therefrom and connected by a universal joint to the first named shaft section and carrying at its rear end a sprocket wheel, a longitudinally extending shaft mounted at the rear end of the automobile and having a sprocket gear wheel operatively connected to the last named gear wheel, and a signaling arm mounted upon the last named shaft.

In testimony whereof I hereunto affix my signature in the presence of two witnesses.

DIRK W. NEARHOF.

Witnesses:
RICHARD C. MANDEL,
ELEANOR MAYER.